United States Patent Office 3,329,955
Patented July 4, 1967

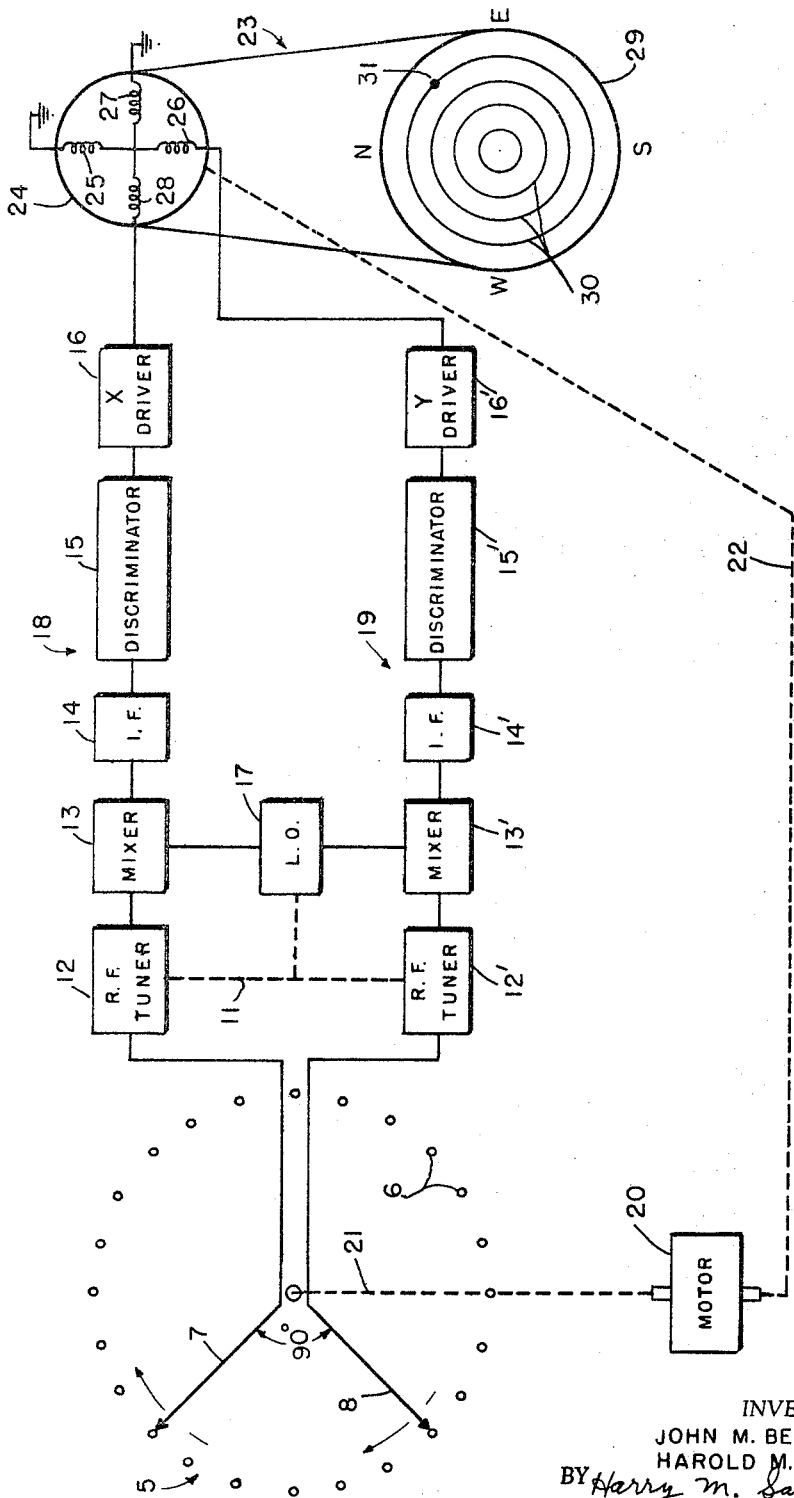

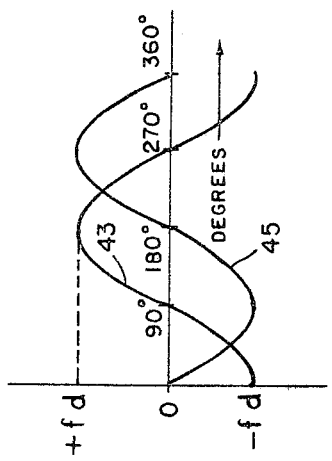
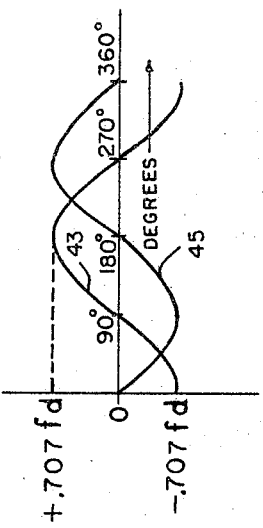
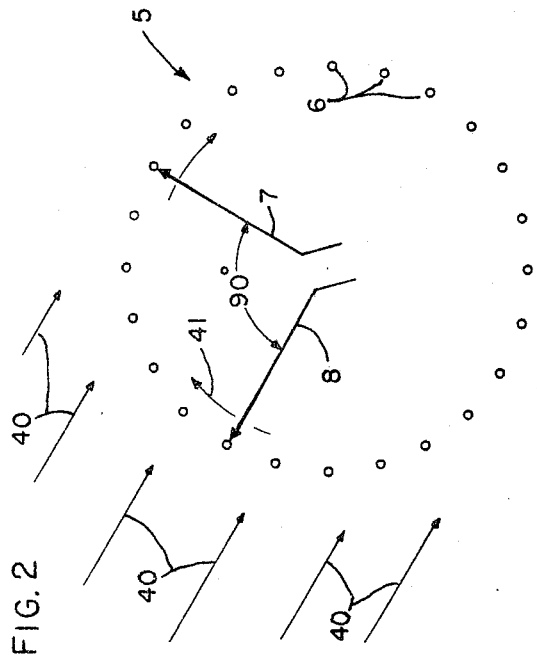
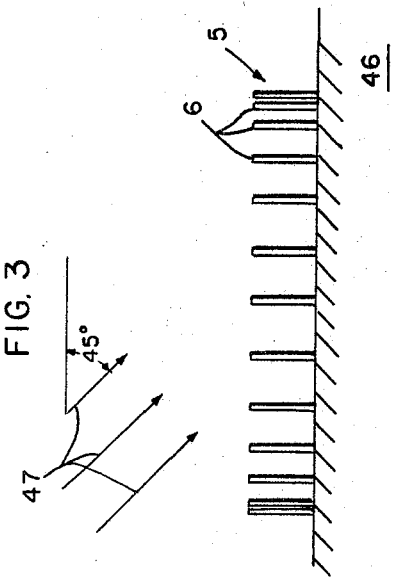

3,329,955
DOPPLER DIRECTION FINDER
John M. Beukers, Stony Brook, N.Y., and Harold M. Jaffe, Neptune, N.J., assignors, by mesne assignments, to the United States of America as represented by the Secretary of the Army
Filed Jan. 10, 1966, Ser. No. 519,785
6 Claims. (Cl. 343—113)

The present invention relates to a Doppler type radio direction finder and more specifically to an improved direction finder of this type in which both the bearing or azimuth and the elevation of an incoming signal may be simultaneously displayed on a single indicator.

A Doppler direction finder is one in which a receiving antenna is cyclically moved so that it alternately recedes from and approaches a remote source of electromagnetic radiation, the direction of which is to be determined. The antenna movement may be actual, for example an antenna may be mechanically rotated at the end of a boom, or the antenna movement may be simulated by sequentially scanning or commutating an array of fixed antennas forming a closed loop. The actual or simulated motion of the receiver antenna impresses an alternating Doppler frequency modulation on the incoming signal. While the antenna is approaching the signal source, the Doppler shift will be positive resulting in an increase in the received signal frequency, and while receding, the received signal frequency will decrease to less than the frequency of the signal source. The phase of rotation of the receiving antenna relative to the phase of the resulting Doppler frequency shifts is a measure of the bearing or azimuth of the incoming signal. It will be appreciated that the maximum Doppler frequency shifts in each direction occur when the antenna velocity toward or away from the signal source is a maximum and will be zero at some point between the positive and negative Doppler shift maxima. For example, if an antenna is rotated circularly in a horizontal plane at a constant speed, the Doppler modulation will be sinusoidal with the maxima occurring at the point at which the direction of propagation of the incoming signal is tangent to the circuit path of the antenna and the points of zero Doppler shift occurring 90° away from the maxima where the direction of propagation is along a diameter of the circular path.

Briefly stated, the present invention utilizes a horizontal circular array of antennas scanned at points 90° apart to obtain two received signals with sinusoidal Doppler frequency modulation in phase quadrature. The two received signals are applied to separate receiving channels where the Doppler modulations thereon are recovered and applied to the X and Y deflection coils of a cathode ray indicator with a rotatable deflection yoke. The deflection yoke is driven synchronously with the antenna scanning mechanism so that the cathode ray beam remains fixed at a circumferential position corresponding to the azimuth of the incoming signal and at a radius from the cathode ray tube center which varies with the angle of elevation of the incoming signal.

It is therefore an object of this invention to provide a novel and useful radio direction finder of the Doppler type.

Another object of the invention is to provide a radio direction finder capable of determining both the azimuth and elevation of an incoming signal.

A further object of the invention is to provide a radio direction finder in which the azimuth and elevation of an incoming signal are simultaneously displayed on a single indicator.

A still further object of the invention is to provide a novel Doppler direction finder with increased speed of response to short-duration or transient signals.

Another object of the invention is to provide a Doppler type radio direction finder in which the position of a single cathode ray beam is an indication of both the azimuth and elevation of an incoming signal.

These and other objects and advantages of the invention will become apparent from the following detailed description and drawings, in which—

FIG. 1 is a block diagram of an illustrative embodiment of the present invention, and FIGS. 2, 2a, 3, and 3a are diagrams useful in explaining the principles of operation of the present invention.

In FIG. 1 the numeral 5 denotes a top or plan view of a circular array of fixed vertical monopole antennas 6. The spacing of adjacent monopoles is made less than 180 electrical degrees at the operating frequency to avoid phase ambiguities due to the scanning of the array. The array diameter will normally be a substantial number of wavelengths of the incoming frequency. Simulated rotation of the array 5 is obtained by means of the scanning mechanism comprising arms or commutators 7 and 8 which are separated by 90°. The motor 20 rotates the arms 7 and 8 at a constant speed in the clockwise direction through linkage 21. The commutators 7 and 8 are shown as nearly equal in length to the radius of the array, however in practice a much smaller commutator would be located at the center of the antenna array and would be connected to the individual antennas by means of cables of equal length. The commutator 7 is connected to the input of a first receiving channel 18 comprising RF tuner 12, mixer 13, IF amplifier 14, frequency discriminator 15 and X driver 16. The output of the X driver is connected to the X deflection coils 27 and 28 of the cathode ray tube 23. The commutator 8 is connected to the input of a second similar receiving channel 19 comprising RF tuner 12', mixer 13', IF amplifier 14', frequency discriminator 15' and Y driver 16'. The output of the Y driver is connected to the Y deflection coils 25 and 26 of the cathode ray tube. The deflection yoke 24 carrying the coils 25, 26, 27 and 28 is rotatable around the neck of the cathode ray tube and is rotated in synchronism with the two commutators by means of linkage 22, which is driven by motor 20. Connection is made to the deflection coils and the commutators by means of slip rings, not shown. The local oscillator 17 is connected to both of the mixers 13 and 13'. The two RF tuners and the local oscillator are gang-tuned as indicated by the linkage 11. The two RF tuners are both tuned to the frequency of the remote signal the direction of which is desired. The local oscillator and the mixers convert the signals in each channel to an intermediate frequency which is amplified in the two IF amplifiers and applied to the two discriminators 15 and 15'. The discriminators have a center frequency equal to the intermediate frequency. The X and Y drivers are amplifiers for coupling the discriminator outputs to the two deflection coils. The screen 29 of the cathode ray tube 23 is calibrated circumferentially with the points of the compass, N, E, S and W and includes concentric rings 30 calibrated in degrees of elevation of the incoming signal.

The mode of operation of the circuitry of FIG. 1 can be explained with reference to FIGS. 2, 2a, 3 and 3a. FIG. 2 shows a plan view of the antenna array 5 of FIG. 1 with an incoming signal indicated by the arrows 40. The commutators 7 and 8 are assumed to rotate clockwise as indicated by the arrow 41. FIG. 2a is a graph showing the detected Doppler frequency modulation of each channel at the outputs of the discriminators 15 and 15' for one revolution of the commutators 7 and 8, starting from the position illustrated in FIG. 2. It is assumed that the vertical antennas 6 are arranged in a circle on flat ground and further that the incoming signal 40 has substantially zero elevation, that is, its direction of propagation is parallel to the earth. The scanning of the antenna array by the commutators 7 and 8 simulates a pair of antennas 90° apart rotating in a circular path with a diameter equal to that of the fixed array 5. With the commutators in the position shown in FIG. 2, the commutator 7 is receding from the signal 40 at its maximum velocity since the direction of propagation of signal 40 is tangent to the array at this point. This results in a maximum Doppler decrease in the apparent frequency of the signal 40 in the first receiving channel 18 connected to commutator 7. Thus at zero degrees the output 43 (FIG. 2a) of discriminator 15 is at its negative maximum of $-f_d$. Also, the commutator 8, as shown in FIG. 2, has its movement parallel to the wavefront of the signal 40 and thus there will be no Doppler shift in this point. Thus at zero degrees in FIG. 2a, the output 45 of discriminator 15' is zero. After 90° of rotation, the commutator 7 will be travelling parallel to the wavefront of signal 40 and the Doppler shift will pass through zero, as indicated in FIG. 2a, and at the same time the commutator 8 will be receding from signal 40 at maximum speed, thus producing a maximum negative output $-f_d$ from discriminator 15' at this point. Thus the discriminator outputs will be sinusoidal with a fixed 90° phase difference and a frequency equal to the rotational frequency of the antenna scanning mechanism. It can be seen that if the direction of the incoming signal 40 changes, the phases of both discriminator outputs 43 and 45 will change in unison by the same amount as the change in the incoming signal azimuth, while maintaining the 90° phase difference therebetween.

The discriminator outputs, 43 and 45 of FIG. 2a are applied to the X and Y deflection coils of cathode ray tube 23 after amplification in X and Y drivers 16 and 16'. In the absence of rotation of deflection yoke 24, the two equal-amplitude, quadrature-phased signals 43 and 45 applied to the coils thereof will cause the cathode ray beam to describe a circular trace on the screen 29. The rotational speed of the beam in producing the circular trace will be the same as the speed of the antenna scanning mechanism 7 and 8, the phase of the beam relative to the phase of the scanning mechanism 7 and 8 will vary with the azimuth of the incoming signal and the diameter of the circular trace will depend on the amplitude, $f_d$, of the discriminator outputs. By rotating the deflection yoke in the opposite direction from the cathode ray beam movement and at the same speed, the beam will assume a fixed circumferential position on the screen 29, as indicated at 31 thereon in FIG. 1. The circumferential position of the spot 31 will depend on the phases of the discriminator outputs which in turn depend on the azimuth of the incoming signal. The screen 29 may thus be circumferentially calibrated with the points of the compass. The synchronous rotation of the yoke 24 is accomplished by linkage 22.

FIGS. 3 and 3a illustrate how the device can simultaneously indicate the elevation of an incoming signal. FIG. 3 is a side view of the circular antenna array 5 of FIG. 2, showing the flat ground 46 and an incoming signal 47 having an elevation angle of 45°. FIG. 3a shows the outputs 43 and 45 of the two discriminators for the incoming signal 47 with the assumption that the signal azimuth and all other factors are the same as in FIGS. 2 and 2a. The only difference between the curves of FIGS. 2a and 3a is the amplitude. This is due to the fact that only the component of the incoming signal velocity which is parallel to the earth 46 is effective in producing any Doppler shift as the antenna array is scanned. It is obvious that for a signal arriving from directly overhead, the simulated motion of the antenna array would not cause any receding or approaching motion relative to the signal source and hence there would be no Doppler modulation. Since the signal 47 has an elevation of 45°, it has a component of propagational velocity parallel to the earth equal to the cosine of 45° times its wavefront propagational velocity. Thus the maxima of the doppler shifts will be only 70.7% in amplitude compared to the same signal arriving parallel to the earth. This reduction in the output of the discriminators and in the input to the deflection coils of the cathode ray tube will cause the spot 31 on the screen 29 to move in toward the center of the screen. Thus the radial position of the spot is a measure of the angle of elevation of the incoming signal and this may be determined from the calibrated elevation rings 30. In operation, the outermost ring 30 would be calibrated to indicate an incoming signal of zero elevation and the innermost ring 30 an elevation angle near 90°.

In addition to its other advantages, the illustrated direction finder has an increased speed of response compared to conventional direction finders. By utilizing two rotating antennas or two commutators in quadrature, sine and cosine information is simultaneously produced at each transition from one antenna to the next, permitting almost instantaneous determination of aimuth and elevation. With the illustrated commutated array of antennas, the speed of response is shorter the greater the number of antennas in the array. With a pair of moving antennas, the speed of response would be limited only by the bandwith of the receiving channels. This improved speed of response is an important practical advantage when the direction of short-duration or transient-type signals is to be determined.

If the incoming signal is frequency modulated at its source the modulation would interfere with that generated by the scanning action and accurate direction finding would be impossible. This frequency modulation can be eliminated by causing the local oscillator 17 of FIG. 1 to vary in frequency with the modulation of the incoming signal. This can be done simply if the local oscillator 17 forms an IF stage of a separate receiver with a fixed antenna, the receiver being tuned to the incoming signal. Then any frequency changes in the RF tuners 12 and 12' caused by frequency modulation at the signal source would be matched by equal frequency changes in the IF stage which replaces the local oscillator 17. Since the IF stages 14 and 14' select the difference frequency in the outputs of mixers 13 and 13', the frequency modulation of the signal source would be cancelled therein. Such a means for cancelling frequency modulation is disclosed in Beukers Patent No. 3,121,871, issued on February 18, 1964.

While the invention has been described in connection with an illustrative embodiment, the inventive concepts disclosed herein are of general application. Accordingly, the invention should be limited only by the scope of the appended claims.

What is claimed is:
1. A doppler direction finder comprising a horizontal circular array of antennas, a pair of scanning means connected to said array at points spaced by 90°, means to rotate said scanning means at a constant speed, a pair of receiving channels each connected to a separate one of said scanning means, each of said receiving channels being tuned to the same remote signal, the direction of which is to be determined, each of said receiving channels comprising a discriminator for detecting the Doppler modulation in each channel caused by the scanning action, a cathode ray tube with a rotatable deflection yoke and a pair of quadrature-spaced deflection means, means to apply the output of each of said receiving channels to one of said deflection means, and means to rotate said deflection yoke in synchronism with said scanning means.

2. The apparatus of claim 1 in which each of said receiving channels comprises a radio frequency tuner, a mixer, an intermediate frequency amplifier, a frequency discriminator and an amplifier, all connected in cascade, and a local oscillator connected to said mixer of each of said channels.

3. The apparatus of claim 2 in which said local oscillator comprises an intermediate frequency stage of a receiver with a fixed antenna, said receiver being tuned to said remote signal.

4. A Doppler direction finder comprising, means to effectively rotate a pair of quadrature-spaced antennas in a given plane, thereby producing quadrature-phased Doppler modulation of the signals received by said antennas; means to separately detect said Doppler modulation of said signals, means to apply said detected Doppler modulation to a different one of a pair of quadrature-spaced cathode ray deflection means, and means to rotate said deflection means synchronously with said antennas.

5. A Doppler direction finder comprising means to scan an array of antennas arranged in a circle on flat ground with a pair of quadrature-spaced commutators, a receiving channel connected to each of said commutators, said receiving channels being tuned to a remote signal the direction of which is to be determined, each of said channels including discriminator means to detect Doppler modulation caused by the scanning of said array, a cathode ray tube with a rotatable deflection yoke comprising a pair of quadrature-spaced deflection means, means to apply the output of each of said channels to a different one of said deflection means, and means to rotate said yoke synchronously with said commutators, whereby said cathode ray tube produces a spot on its screen with a circumferential position determined by the azimuth of said remote signal and a radial distance from the center of said screen which varies with the elevation of said remote signal.

6. A Doppler direction finder comprising, an array of antennas arranged in a circle on flat ground, a scanning mechanism to sequentially connect each of said antennas to a pair of receivers, said scanning mechanism comprising a pair of commutators rotating around said circle with an angular spacing of 90°, said pair of receivers being tuned to a remote signal, the direction of which is to be determined, said receivers comprising means to detect the Doppler modulation caused by the rotation of said commutators and a single indicator means connected to the outputs of said receivers for displaying the azimuth and elevation of said remote signal.

References Cited

UNITED STATES PATENTS 3,144,646   8/1964   Breithaupt.

RODNEY D. BENNETT, *Primary Examiner.*

R. E. BERGER, *Assistant Examiner.*